A. E. DIETERICH.
METHOD OF EXTRACTING CONES FROM THEIR BAKING MOLDS.
APPLICATION FILED MAY 7, 1918.

1,275,138.

Patented Aug. 6, 1918.

INVENTOR
A.E.Dieterich.
BY
Fred J Dieterich Co
ATTORNEYS

UNITED STATES PATENT OFFICE.

ALBERT E. DIETERICH, OF WASHINGTON, DISTRICT OF COLUMBIA.

METHOD OF EXTRACTING CONES FROM THEIR BAKING-MOLDS.

1,275,138. Specification of Letters Patent. Patented Aug. 6, 1918.

Application filed May 7, 1918. Serial No. 233,124.

*To all whom it may concern:*

Be it known that I, ALBERT E. DIETERICH, a citizen of the United States, and resident of the city of Washington, District of Columbia, have invented a new and Improved Method of Extracting Cones from Their Baking-Molds, of which the following is a specification.

My invention has for its object to provide a new and useful method of removing cones from split molds and their cores, especially such as are used on the automatic cone baking machine of the well-known Bruckman type, and my present invention is diagrammatically illustrated in the accompanying drawing, by reference to which it will be seen—

Figure 1:
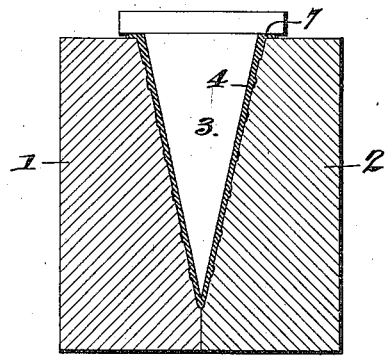
Figure 1 is a transverse section of the mold, the core in elevation and the cone in section illustrating the baking position of the parts.

In the drawing, 1—2 designate the female mold sections, 3 the core and 4 the cone, the mold being corrugated as at 5 to form corrugations 6 on the cone, the excess batter forming "heads" 7 on the cone during the baking operation.

In using my method of extracting cones from the molds, I hold one section—say 2— of the female mold stationary and hold the core stationary. I then move the other female mold section laterally away from the core, cone and stationary female mold section in the direction of the arrows in Fig. 2 until the mold section 1 has been moved sufficiently to release itself from the cone. The cone at this time is held to the stationary section 2 by the core and is prevented from following the movable mold section. I next lift the core 3 vertically upward in the direction coincident with its longitudinal axis and the longitudinal axis of the half cavity of the stationary mold member whereby to strip the core from the cone, the cone adhering to the stationary mold side sufficiently to enable the detachment of the core by a movement of the core in the direction of the arrow on the core in Fig. 3. This detaches the core from the cone but leaves the cone adhering to the stationary mold section 2. After this is done, and before the core is moved entirely upward out of the mold cavity, the core itself is moved bodily laterally in the direction of the horizontal arrow on the core in Fig. 4 until the cone is detached from the stationary mold section 2 by the action of the core as a finger, and drops as shown in Fig. 4.

Figure 2:
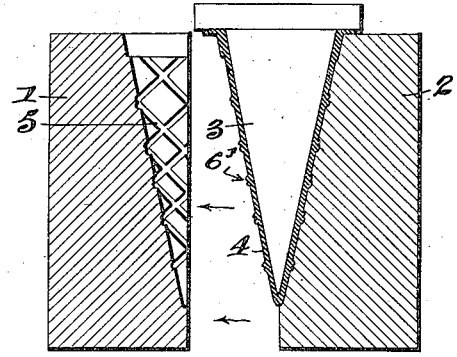
Fig. 2 is a view similar to Fig. 1 showing the first movement.
Figure 3:
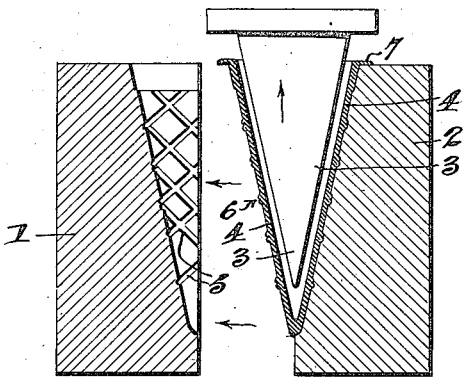
Fig. 3 is a view similar to the preceding figures showing the second movement.
Figure 4:
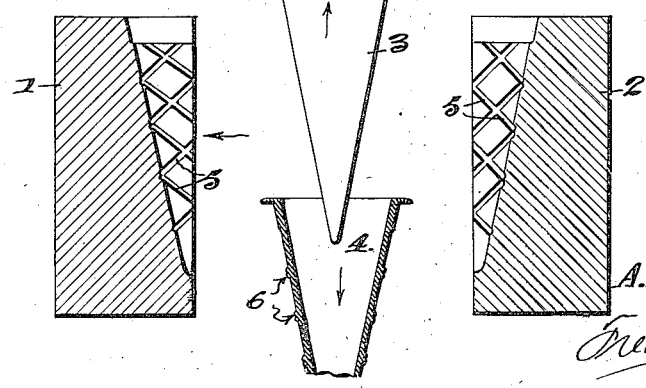
Fig. 4 is a view similar to the preceding figures showing the final movement of the parts.

As a modification of the method described or a reversal thereof the mold section 1 may be held stationary and the core, cone and mold section 2 moved laterally as a unit away from the section 1 opposite to the direction indicated by the arrows in Fig. 2, after which the core may be lifted, as shown in Fig. 3, and then the mold section 2 moved laterally in the direction opposite to the horizontal arrows in Fig. 3 until the cone has become detached from section 2. As a further modification, one of the mold sections (say section 1) can be moved away from the other section while the core remains stationary, as indicated by the arrows in Fig. 2, then the core may be lifted, as shown in Fig. 3, and subsequently the section 2 can be moved in the direction opposite the horizontal arrows in Fig. 3, while holding the core against lateral movement to effect a detachment of the cone and a separation of the molds to a position indicated in Fig. 4.

Thus, it will be seen that I have provided a simple and effective method of removing the cones from the molds, which method will be found useful not only in hand machines, but in connection with automatic machinery for making ice cream cones.

While I have described my method as especially adapted for use in making that form of cup pastry known as "ice cream cones," yet I do not desire to be understood as limiting the invention to the releasing of ice cream cones alone from their molds as the invention is adapted for use in connection with other similar forms of cup pastry.

What I claim is:—

1. The method of releasing cones from their molds which consists in detaching one side of the mold from the cone while holding the cone on the core and to the other side of the mold, loosening the core from the cone, and subsequently detaching the cone from the remaining side of the mold while the core remains projected into the cone.

2. The method of releasing cones from their molds which consists in holding the cone by external and internal engagement at one longitudinal side of the cone while disengaging the other side of the cone from the mold, then releasing the cone from internal engagement, and subsequently releasing the cone from external engagement by internal engagement of the cone on the side first released.

3. The method of releasing cones from split molds which consists in first opening one section of the mold, partly withdrawing the core in the direction of its axis while holding the other section of mold against removal, and releasing the cone from the held mold section by internal engagement.

4. The method of releasing cones from split molds which consists in first opening one section of the mold, partly withdrawing the core in the direction of its axis while holding the other section of mold against removal, then moving the core laterally away from the held mold section to detach the cone therefrom.

5. The method of releasing cones from split molds and their cores which consists in effecting relative movement between one section of the mold on the one hand and the core and other mold section on the other hand, then moving the core axially outward to detach it from the cone and subsequently effecting relative movement between the core and remaining mold section to detach the cone from the remaining mold section.

ALBERT E. DIETERICH.